US012793497B2

(12) United States Patent
Bernstein

(10) Patent No.: US 12,793,497 B2
(45) Date of Patent: Nov. 10, 2026

(54) PORTION CONTROL SYSTEM AND METHOD

(71) Applicant: ELECTRONIC CREDIT SYSTEMS, INC., Highland Park, IL (US)

(72) Inventor: Robert Bernstein, Highland Park, IL (US)

(73) Assignee: ELECTRONIC CREDIT SYSTEMS, INC., Highland Park, IL (US)

( * ) Notice: Subject to any disclaimer, the term of this patent is extended or adjusted under 35 U.S.C. 154(b) by 337 days.

(21) Appl. No.: 18/442,981

(22) Filed: Feb. 15, 2024

(65) Prior Publication Data

US 2025/0265890 A1 Aug. 21, 2025

(51) Int. Cl.
*G07F 13/04* (2006.01)

(52) U.S. Cl.
CPC .................................... *G07F 13/04* (2013.01)

(58) Field of Classification Search
CPC ........... G07F 13/04; G07F 11/66; B26D 5/00; B26D 2210/02; B26D 5/007; B26D 7/28; B26D 7/30; A22C 17/0086; G06Q 20/209; G07G 1/0063; G07G 1/0072
See application file for complete search history.

(56) References Cited

U.S. PATENT DOCUMENTS 6,407,818 B1 * 6/2002 Whitehouse ........... G01B 11/00 356/627
6,882,434 B1 * 4/2005 Sandberg ........... A22C 17/0033 250/559.22
8,185,344 B2 * 5/2012 Troxler .................. G01B 21/20 702/156
11,832,621 B1 * 12/2023 Liu .................... A22C 17/0086
2011/0126680 A1 * 6/2011 Weber .................. B26D 7/2635 83/13
2012/0059500 A1 * 3/2012 Kim ....................... B26D 7/018 700/98
2012/0198974 A1 * 8/2012 Weber .................... B26D 5/007 83/365
2018/0085966 A1 * 3/2018 Schmidt ................. B26D 1/143
2020/0288729 A1 * 9/2020 Blaine .................. A22C 17/002
2023/0219249 A1 * 7/2023 Schäfer .................... B26D 7/32 83/29
2024/0041056 A1 * 2/2024 Arnason ................ A22C 25/18
2024/0090516 A1 * 3/2024 Mc Donnell ........ A22C 17/008

* cited by examiner

*Primary Examiner* — Michael Collins
(74) *Attorney, Agent, or Firm* — Carroll, Hoette & Butscher, LLC; William Breeze

(57) ABSTRACT

A portion control system includes an optical scanner, a cutting device, and a controller. The optical scanner generates a three-dimensional coordinate map of a bulk product disposed on a platform. The controller receives a target weight for a target portion to be excised from the bulk product. The controller determines a density of the bulk product and calculates a target volume of the target portion to be excised based on the target weight and the density. The controller determines, based at least on the three-dimensional coordinate map of the bulk product and the target volume, a cut path through the bulk product that is disposed on the platform, and controls the cutting device to cut the bulk product along the cut path to sever the target portion from a remainder of the bulk product.

20 Claims, 3 Drawing Sheets

PORTION CONTROL SYSTEM AND METHOD

FIELD

The subject matter herein relates to excising portions of bulk products via a computerized system for accurate portion control.

BACKGROUND

There are various application in which a portion of a bulk product is manually excised from the remainder of the bulk product in an attempt to ascertain an excised portion that has a desired, or target, weight. For example, deli counters and meat and seafood counters typically have a multitude of different food products available for customers. Some of the food products are too large for a typical customer to purchase and use, so the customer requests a vendor to excise a portion of the food product. The food product may be a fish, beef, lunch meat, cheese, prepared dishes (e.g., casseroles, salads, etc.), or the like. The customer may instruct the vendor which type of food product the customer desires and the target weight of the portion of the food product to buy. In the conventional process, the vendor extracts a first portion of the customer-selected food product, and then weighs the first portion on a weight scale. If the weight of the first portion is below the target weight, then the vendor may cut out a second portion of the food product to add to the first portion. If the first portion is above the target weight, the vendor may remove some of the material of the first portion and/or ask the customer if the excess amount is acceptable.

The vendor thus performs a manual guess-and-check process, using the weight of the excised portion as feedback, to narrow in on the target weight. This manual process is imprecise and inefficient. This manual process is dependent on the experience level of the vendor. Inexperienced vendors may require several cuts of the bulk product to reach the target weight. Furthermore, imprecise cuts from an inexperienced vendor may increase the amount of food or other bulk product that is wasted. The bulk products may have irregular shapes and/or non-uniform densities, so simple length measurements may not be effective to obtain accurate portion control.

Accordingly, a need exists for a more efficient and accurate system and method of providing portion control from a bulk product, particularly for use with bulk products that have irregular shapes and/or complex, non-uniform compositions.

SUMMARY

In one or more embodiments, a portion control system is provided that includes an optical scanner, a cutting device, and a controller that includes one or more processors. The optical scanner is configured to generate a three-dimensional coordinate map of a bulk product disposed on a platform. The controller is operably connected to the optical scanner and the cutting device. The controller is configured to receive a target weight for a target portion to be excised from the bulk product. The controller is configured to determine a density of the bulk product and to calculate a target volume of the target portion to be excised based on the target weight and the density. The controller is configured to determine, based at least on the three-dimensional coordinate map of the bulk product and the target volume, a cut path through the bulk product that is disposed on the platform, and to control the cutting device to cut the bulk product along the cut path to sever the target portion from a remainder of the bulk product.

In one or more embodiments, a method for excising a portion of a bulk product is provided. The method includes receiving, at a controller including one or more processors, a target weight for a target portion to be excised from a bulk product. The method includes acquiring a three-dimensional coordinate map of the bulk product. The three-dimensional coordinate map is generated by an optical scanner while the bulk product is disposed on a platform. The method includes determining, via the controller, a density of the bulk product, and calculating a target volume of the target portion to be excised based on the target weight and the density. The method includes determining, via the controller and based at least on the three-dimensional coordinate map of the bulk product and the target volume, a cut path along the bulk product that is disposed on the platform, and generating a control signal to control a cutting device to cut the bulk product along the cut path to sever the target portion from a remainder of the bulk product.

DETAILED DESCRIPTION

Embodiments of the inventive subject matter describe a portion control system designed to provide efficient and accurate excision of portions of bulk products. The portion control system is a computerized system with automated operations. The portion control system is designed to receive information about desired characteristics of a portion of the bulk product to be excised, where the information includes at least a target weight of the portion. The portion control system analyzes properties of the bulk product, including the volume of the bulk product and the density of the bulk product. Based on this analysis, the portion control system determines a cut path through the bulk product. The portion control system then controls a cutting device to cut along the cut path and sever a target portion of the bulk product from the remainder of the bulk product. The portion control system is designed so that the severed target portion has approximately the target weight as requested. For example, the weight of the target portion that is actually excised from the bulk product may be within 2%, 1%, or even 0.5% of the target weight. This accurate portion control is accomplished using only a single cut (e.g., the cutting device following a single cut path) through the bulk product. The portion control system does not perform the imprecise guess-and-check process that is typically performed manually by a vendor. For example, the portion control system may not even weigh the target product after the target product is excised. The portion control system does not rely on the weight of the target product for feedback. Optionally, a vendor may choose to manually weigh the target product on a weight scale after the target product is produced for verifying to a customer that the target product has approximately the target weight.

One or more technical effects of the portion control system described herein include increased efficiency, as the portion control system may yield a target portion that has the target weight in less time than the traditional manual process of repeatedly cutting and then weighing the excised portion. Another technical effect may be enhanced accuracy, as the computerized system may generally provide more accurate target portions of a bulk product than a human vendor. Furthermore, the portion control system may desirably reduce labor costs by at least partially automating the process of excising portions of a bulk product, reducing the manpower needed for providing portion control. Another technical effect may be to reduce food waste, as the portion control system may make fewer cuts through the bulk product per target portion, on average, than a human vendor. For example, the portion control system is designed to excise each target portion of a bulk product using only a single cut path.

Figure 1:
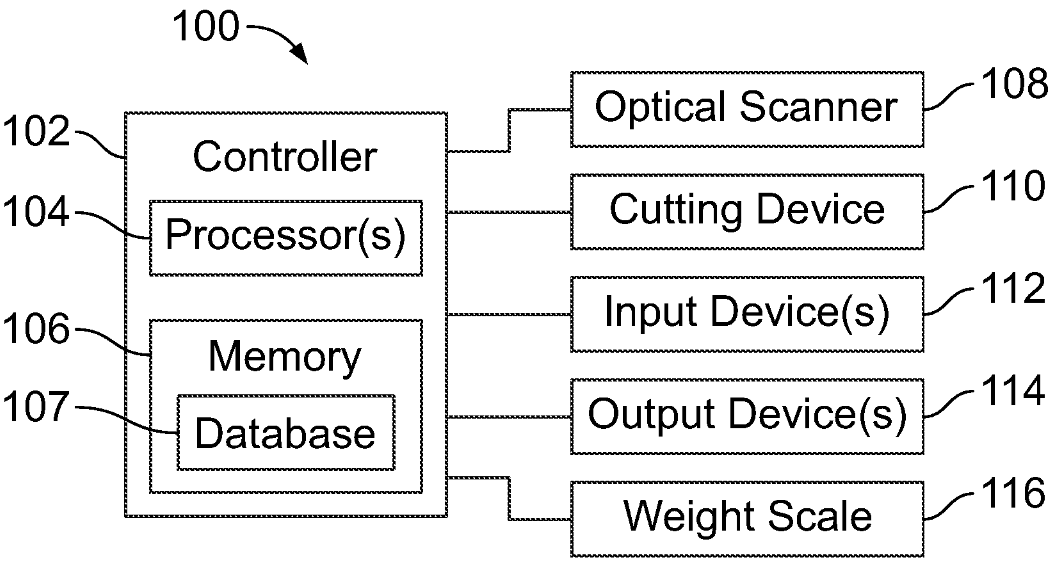
FIG. 1 is a block diagram illustrating a portion control system formed in accordance with one or more embodiments.

FIG. 1 is a block diagram illustrating a portion control system 100 formed in accordance with embodiments herein. The portion control system 100 includes a controller 102 that performs at least some of the operations described herein to provide portion control by excising a target portion from a bulk product. The controller 102 represents hardware circuitry that includes and/or is connected with one or more processors 104 (e.g., one or more microprocessors, integrated circuits, microcontrollers, field programmable gate arrays, etc.). The controller 102 includes and/or is connected with at least one tangible and non-transitory computer-readable storage medium (e.g., memory device) 106. For example, the one or more processors 104 are communicatively connected to the at least one memory device 106. The at least one memory device 106 may store programmed instructions (e.g., software) that are executed by the one or more processors 104 of the controller 102 to perform the operations of the controller 102 described herein. The programmed instructions may instruct the one or more processors 104 how to control the other components of the portion control system 100. The programmed instructions may provide one or more algorithms that are performed by the one or more processors 104 as described herein. The memory device 106 may store additional information, such as a database 107 that contains a look-up table accessible to the one or more processors 104.

The portion control system 100 includes additional components that are operably connected to the controller 102. For example, the additional components may include an optical scanner 108, a cutting device 110, one or more input devices 112, one or more output devices 114, and a weight scale 116. The additional components may be operably connected to the controller 102 via respective wired or wireless communication pathways. For example, the controller 102 may generate control signals that are communicated along the communication pathways to the additional components to control operation of the additional components. The controller 102 may receive information (e.g., data) from the additional components via the communication pathways. For example, the controller 102 may receive a three-dimensional coordinate map of a bulk product from the optical scanner. In another example, the controller 102 may receive a user input command from the user input device 112. The user input command may indicate a target weight of a target portion of a bulk product to excise. The user input command may be generated by the user input device 112 in response to a user (e.g., a customer) manipulating the user input device 112, such as by typing a message, pressing designated buttons, providing a voice command, and/or the like.

Optionally, the portion control system 100 may have at least one additional component that is not shown in FIG. 1. For example, the portion control system 100 may include a spectrometer, an x-ray device, an ultrasound device, and/or a discrete camera (e.g., separate from the optical scanner). In another embodiment, the portion control system 100 may lack one or more of the additional components shown in FIG. 1. For example, the portion control system 100 may lack the weight scale 116 and/or the output device(s) 114, as described herein.

The optical scanner 108 scans a bulk product and generates a three-dimensional coordinate map of the bulk product. The optical scanner 108 may be a non-contact sensor that determines the relative locations of thousands or millions of individual points along the outer perimeter surface(s) of the bulk product. In an example, the optical scanner 108 may be a laser volumeter or a non-contact coordinate measuring machine (CMM). The optical scanner 108 assigns coordinates to the detected points in a coordinate field, where all points are relative to a point of origin in the coordinate field. The three-dimensional coordinate map is defined by the coordinates of the individual points that are detected by the optical scanner 108 during a scanning process. The three-dimensional coordinate map represents a virtual rendering of the bulk product.

The controller 102 receives the three-dimensional coordinate map from the optical scanner 108, such as in the form of a scan file. The controller 102 may analyze the three-dimensional coordinate map of the bulk product. In an example, the controller 102 may determine a volume of the bulk product based on the size and shape of the three-dimensional coordinate map. In another example, the controller 102 may identify the type of bulk product based at least in part on the three-dimensional coordinate map. For example, the controller 102 may compare the shape and/or size of the bulk product, as represented in the three-dimensional coordinate map, to sizes and/or shapes of known products and identify the bulk product based on a level of correspondence or match with the known products. The sizes and/or shapes of the known products may be stored in a database, such as the database 107, acquired via training of an artificial intelligence (AI) machine learning algorithm, or the like. The controller 102 uses the three-dimensional coordinate map of the bulk product to determine a cut path through the bulk product to excise or sever a target portion of the bulk product that has a target weight. For example, the controller 102 may analyze the three-dimensional coordinate map to determine coordinates of a cut path that will yield the target portion.

The cutting device 110 is controlled by the controller 102 to cut the bulk product along a determined cut path to sever a target portion of the bulk product from a remainder of the bulk product. After determining the cut path, the controller 102 may generate control signals, based on the coordinates of the cut path in the coordinate field, to control the cutting device 110 to cut the actual bulk product. For example, although there may be no physical cut path drawn or otherwise shown on the bulk product, the cutting device 110 may be controlled to follow the cut path that is defined along the virtual rendering of the bulk product in the three-dimensional coordinate map. In an example, the cutting device 110 includes a laser that pierces and cuts through the bulk product along the cut path. The cutting device 110 may include a scanning head that aims the laser to follow the cut path while the cutting device 110 itself remains fixed in a secured location on a portion control machine. In another example, the cutting device 110 includes a blade that physically pierces and cuts through the bulk product. The cutting device 110 may include an actuator and/or robotic arm that control the angle of the blade and the position of the blade in three (e.g., x, y, and z) dimensions. The actuator and/or robotic arm may be controlled to move the blade along the cut path to excise the target portion of the bulk product.

The one or more user input devices 112 may permit a human operator, such as a vendor, to interact with the portion control system 100. A human operator may use an unput device 112 to submit a user input command that provides instruction to the controller 102 about a desired task. For example, a user input command may indicate a target weight of the target portion of the bulk product to be excised from the bulk product. In a food counter application, a customer may tell a vendor which product the customer is interested in purchasing and the target weight of that product. The vendor may then pick up the bulk product, place the bulk product on a platform of the portion control system 100, and use one of the user input devices 112 to input the customer-selected target weight into the portion control system 100. The user input device 112 may convey the information that is input by the vendor to the controller 102. The controller 102 determines the cut path based on both the three-dimensional coordinate map of the bulk product and the target weight. The one or more input devices 112 may include physical buttons, a keyboard, virtual buttons on a touchscreen, a graphical user interface (GUI), a mouse, a microphone, or the like. Optionally, the operator may use the one or more input devices 112 to provide additional information to the controller 102, such as to identify the type of the bulk product that is selected and/or a specific request of the customer. The specific request may indicate a segment or composition of the bulk product that is requested by the customer to be included in the target portion, a segment or composition of the bulk product that is to be avoided in the target portion, or the like. For example, a customer may prefer a specific designated cut of meat, a specific thickness of lunch meat slices, a lean portion of meat, a fatty portion of meat, or the like.

The one or more output devices 114 may be controlled by the controller 102 to provide information about the cutting process and/or the target portion of the bulk product that is excised. The one or more output devices 114 may include a printer that generates a label, a display screen, an audio speaker, and/or the like. For example, after cutting the target portion of the bulk product, the controller 102 may control the printer to print a label that provides information about the target portion. The information may include a type of the target portion and/or bulk product (e.g., salmon fillet), a weight of the target portion, a cost of the target portion, a cost per weight of the bulk product, a specific cut or other custom user selection provided to the vendor, and/or the like. The label may be secured to a package that contains the target portion. The label may have an adhesive backing. The display screen may display similar information. Optionally, the display screen may display an indication of a current status of the cutting process and/or may display the three-dimensional coordinate map of the bulk product.

The weight scale 116 is used to measure a weight of the bulk product. For example, the weight scale 116 may be integrated with a platform. The bulk product is placed on the platform and remains disposed on the platform during the scanning and cutting processes. The weight scale 116 may generate a sensor signal that is communicated to the controller 102. The sensor signal generated by the weight scale 116 indicates a measured weight of the bulk product. The measured weight may be in units of grams or the like.

Figure 2:
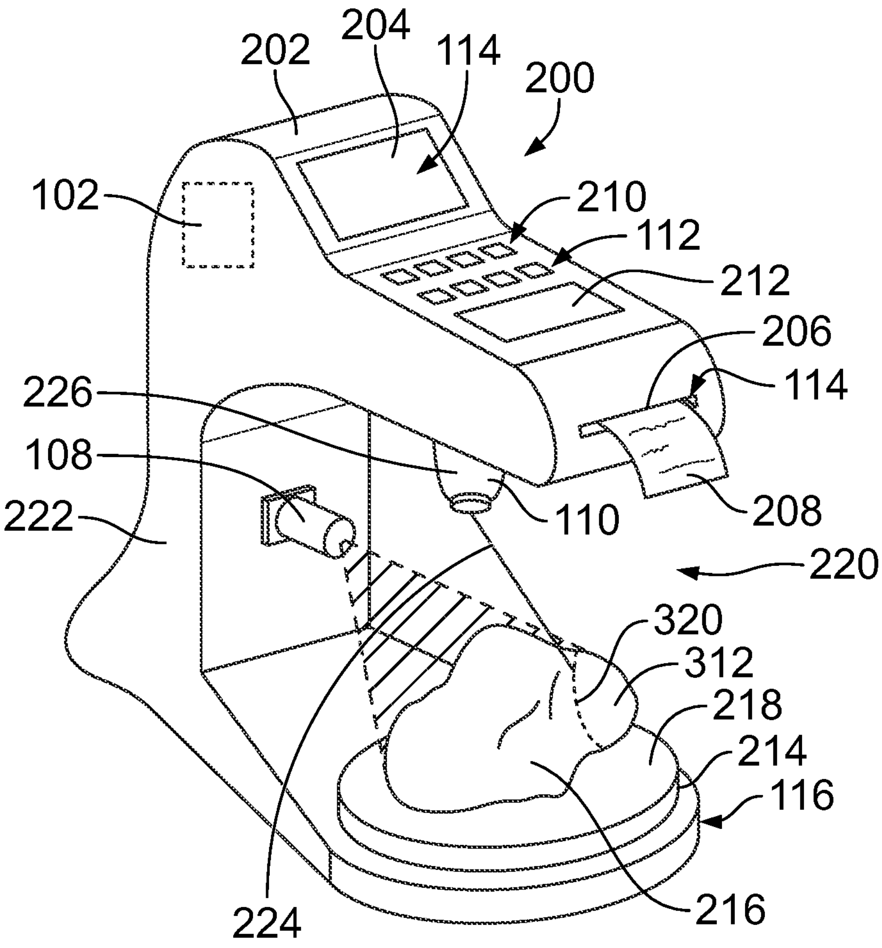
FIG. 2 illustrates a portion control machine on which the portion control system is implemented according to an embodiment.

FIG. 2 illustrates a portion control machine 200 on which the portion control system 100 (shown in FIG. 1) is implemented according to an embodiment. The portion control machine 200 includes a housing 202. The housing 202 may contain and/or hold several components of the portion control system 102 in a fixed position. For example, the housing 202 holds the optical scanner 108 and the cutting device 110. The housing 202 may contain the controller 102 within an internal portion of the housing 202. In the illustrated example, the one or more input devices 112 and the one or more output devices 114 are secured on the housing 202. For example, the portion control machine 200 may include a display screen 204, a printer 206 that prints labels 208, several physical buttons 210, and a touchpad or touchscreen 212. The specific types of input and output devices and the locations of the input and output devices shown in FIG. 2 merely indicate one example implementation of the portion control machine 200.

The portion control machine 200 also includes a platform 214 that is secured to the housing 202. The platform 214 receives the bulk product 216 on a top surface 218 of the platform 214. In an example, the platform 214 may revolve 360 degrees about a central axis to spin the bulk product 216 relative to the housing 202 (and the optical scanner 108 and the cutting device 110 thereon). For example, the platform 214 may be mechanically connected to an actuator that is selectively controlled by the controller 102 to rotate the platform 214 during the scanning process and/or during the cutting process. The weight scale 116 may be integrated with the platform 214 to measure the weight of the bulk product 216 that is disposed on the platform 214. The housing 202 may define a window 220, which is an open space, above the platform 214 to accommodate the bulk product 216 without physically contacting the bulk product 216.

In the illustrated example, the optical scanner 108 and the cutting device 110 are mounted at respective elevated positions relative to the platform 214. In an example, the optical scanner 108 is laterally fixed in place, and the platform 214 rotates to enable the optical scanner 108 to scan the entire circumference of the bulk product 216. The optical scanner 108 may be vertically movable relative to the housing 202 along a track defined along an upright section 222 of the housing 202. The controller 102 may control vertical movement of the optical scanner 108 along the track, via an actuator, to enable the optical scanner 108 to scan both the top and bottom portions of the bulk product 216 for an accurate three-dimensional coordinate map. In an example, the cutting device 110 is a laser emitter 226 that emits a laser beam 224 to cut the target portion of the bulk product 216. The laser emitter 226 may include a scanning head that aims the laser without requiring physical movement of the laser emitter 226 itself. Optionally, the laser emitter 226 may be physically movable along one or more dimensions relative to the housing 202 to permit the laser beam 224 to reach a greater percentage of the surface area of the bulk product 216 than if the laser emitter 226 is fixed in place. For example, the laser emitter 226 may be moved, during the cutting process, along a least one track in the housing 202 by an actuator that is controlled by the controller 102.

An operator, such as a vendor, may use the portion control machine 200 to sever a target portion of the bulk product 216, where the target portion has a weight that is approximately a user-selected target weight. The portion control machine 200 may excise the target portion of the bulk product 216 without measuring the weight of the target portion. For example, the portion control machine 200 does not cut a first portion of the bulk product 216, then weigh the first portion, compare that weight of the first portion to the target weight, and then determine whether to cut a second portion of the bulk product 216 or remove part of the first portion based on a deviation between the weight of the first portion and the target weight.

The controller 102 receives a target weight for a target portion to be excised from the bulk product 216. The operator may input the target weight using the one or more input devices 112. For example, the operator may press one or more physical buttons 210 or virtual buttons on the touchscreen 212 to input the target weight. The target weight may be communicated to the operator from a user, such as a customer of the vendor.

Figure 3:
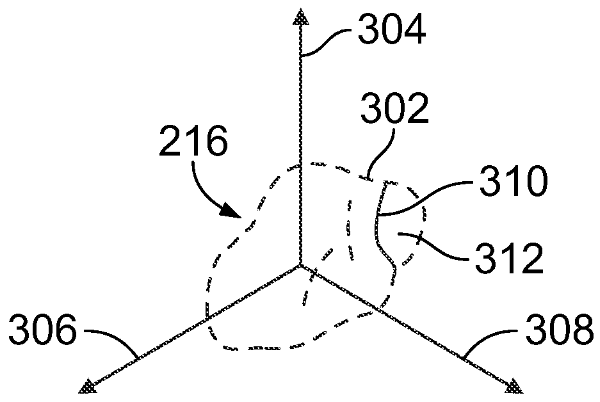
FIG. 3 illustrates a three-dimensional coordinate map of a bulk product shown in FIG. 2.

Once the bulk product 216 is on the platform 214, the controller 102 controls the optical scanner 108 to scan the bulk product 216 and generate a three-dimensional coordinate map of the bulk product 216. FIG. 3 illustrates a three-dimensional coordinate map 302 of the bulk product 216 shown in FIG. 2. The three dimensional coordinate map 302 is rendered in a coordinate field or system that includes a vertical axis 304, a longitudinal axis 306, and a lateral axis 308, which are mutually perpendicular. The three-dimensional coordinate map 302 is a virtual rendering of the bulk product 216 that is generated by the optical scanner 108 scanning the bulk product 216 on the platform 214.

Returning now to FIG. 2, the controller 102 determines a density of the bulk product 216. In a first example, the controller 102 calculates the density of the bulk product 216 based on the weight of the bulk product 216 and the volume of the bulk product 216. For example, the weight of the bulk product 216 may be measured by the weight scale 116 while the bulk product 216 is on the platform 214. The controller 102 receives a weight value representing the weight of the bulk product 216 from the weight scale 116. In an alternative embodiment, the portion control machine 200 lacks the weight scale 116, and the operator places the bulk product 216 on a separate weight scale to measure its weight. The controller 102 may determine the volume of the bulk product 216 based on the three-dimensional coordinate map generated by the optical scanner 108. For example, the controller 102 may use the coordinates of the points to integrate the dimensions of the bulk product and calculate the volume of the bulk product 216. The controller 102 may determine the density of the bulk product 216 by dividing the weight (e.g., mass) by the volume.

In another example, the controller 102 may determine an identity of the bulk product 216 and then access a look-up table to acquire a stored density value for the specific bulk product 216. Thus, the controller 102 may essentially look-up the density for the bulk product 216 without actually calculating the density. There are multiple ways in which the controller 102 may determine the identity of the bulk product 216. In a first example, the one or more input devices 112 may include a reader device, such as an RFID reader, a barcode or QR code scanner, or the like. The operator may acquire an RFID tag, barcode, QR code, or the like that is associated with the bulk product that is selected, and may scan the RFID tag, barcode, QR code, etc. via the reader device. The reader device then communicates a signal to the controller 102 that indicates the identity of the bulk product. The controller 102 may receive the signal from the reader device and determine the identity of the bulk product 216. The identity may refer to the type of bulk product 216, such as a type of meat, a type of prepared dish, etc. The identity optionally may indicate a specific manufacturer or brand associated with the bulk product 216.

In a second example, the controller 102 may determine the identity of the bulk product 216 based on an analysis of visual characteristics of the bulk product 216. For example, the controller 102 may analyze the size and shape of the bulk product as represented in the three-dimensional coordinate map. The controller 102 may compare the size and shape of the bulk product in the three-dimensional coordinate map to pre-determined sizes and shapes of known types of bulk products. The pre-determined sizes and shapes of the known types of bulk products may be stored in a database, such as the database 107. The controller 102 may determine a level of correspondence or match between the measured sized and shape of the bulk product 216 on the platform 214 and the pre-determined sizes and shapes of the known types. If the level of correspondence with a first type of the known types exceeds a threshold value, such as 90%, 95%, or the like, the controller 102 may identify the bulk product 216 on the platform 214 as the first type.

In another example, the controller 102 may include an AI machine learning algorithm that is trained to determine the identity of the bulk product 216 based on the visual characteristics of the bulk product 216. For example, the AI machine learning algorithm may be trained via hundreds of labeled training images to distinguish between different types of bulk products that may be placed on the platform 214. The AI machine learning algorithm may include an artificial neural network. The AI machine learning algorithm may analyze the size and shape of the bulk product 216 as represented in the three-dimensional coordinate map. Optionally, the optical scanner 108 may capture color and/or other parameters of the bulk product 216, besides the size and shape. In that case, the AI machine learning algorithm may analyze the color of the bulk product 216 to determine the identity of the bulk product. Optionally, the portion control system 100 (and portion control machine 200) may include a separate camera or spectrometer that generates image data (e.g., acquires or captures the image data based on light in the surrounding environment) of the bulk product 216 on the platform 214, where the image data depicts the color of the bulk product 216 in the visual wavelength spectrum. The AI machine learning algorithm may receive the image data generated by the separate camera and/or spectrometer to determine the identity of the bulk product 216.

The various examples above describe that the controller 102 can determine the identity of the bulk product 216 on the platform 214. The controller 102 may then use the identity to determine the density of the bulk product 216. For example, the controller 102 may access a look-up table that is stored in the database 107 (shown in FIG. 1) or a remote database. The look-up table may include a list of various bulk products and corresponding density values for each of the bulk products in the list. The controller 102 may use the determined identity of the bulk product 216 to determine the density value stored in the database 107 that is associated with that specific bulk product 216.

In another example, the portion control system 100 (e.g., portion control machine 200) may include a sensor device that directly measures the density of the bulk device 216. For example, the portion control system 100 may include an X-ray device, an ultrasound device, or the like. The controller 102 may receive a measurement of the density of the bulk device 216 from such a sensor device.

Once the controller 102 has determined the density of the bulk device 216, the controller 102 may calculate a target volume of the target portion of the bulk product to be excised based on the density and the target weight. For example, the controller 102 may divide the target weight by the density to calculate the target volume. The target volume represents the volume of the bulk product 216 to cut off to yield a portion of the bulk product 216 that has (approximately) the target weight. Thus, the operator may input the target weight based on a selection made by a customer, for example, and the controller 102 determines the target volume of the target portion to excise based in part on that target weight.

With reference to FIG. 3, the controller 102 may determine a cut path 310 through the bulk product 216 that is disposed on the platform 214. The controller 102 may determine the cut path 310 based on the three-dimensional coordinate map 302 and the target volume that is calculated. For example, the controller 102 may analyze the three-dimensional coordinate map 302 and select a cut path 310 that would sever a target portion 312 of the bulk product 216 that has the target volume. For example, the controller 102 may select a distance from an edge of the bulk product 216 at which to place the cut path 310 and a length of the target portion needed to achieve the target volume, using knowledge of the volume of the three-dimensional coordinate map 302. In some examples, the cut path 310 may have a non-linear trajectory from an initial cut location to a final cut location on the bulk product 216. For example, the cut path 310 may have one or more turns and/or curved segments.

One of the benefits of the portion control system 100 (e.g., the portion control machine 200) is that it is applicable for use with irregularly-shaped objects. As shown in FIGS. 2 and 3, the bulk product 216 may have an irregular shape. For example, the bulk product 216 may be asymmetric along at least one dimension. The bulk product 216 in several applications may be a food product. For example, the bulk product 216 may be a block of lunch meat, a portion of an animal (e.g., cow, pig, turkey, etc.), a fish, or the like. Due to the irregular shape, it is complex and difficult to estimate dimensions of a target portion to excise that would produce a target portion that has the target weight. The controller 102 uses the three-dimensional coordinate map 302 of the bulk product 216 to accurately determine the cut path 310 that would yield a target portion 310 having the target weight, regardless of whether the bulk product 216 has a regular shape or an irregular shape. In other examples, the bulk product may be other types of food products, such as prepared dishes (e.g., casseroles, pasta salads, potato salads, etc.). The bulk products that can be used with the portion control system 100 and machine 200 described herein are not limited to food products, however. The bulk product may be various other types of products in other applications.

After determining the cut path 310 on the three-dimensional coordinate map 302, the controller 102 controls the cutting device 110 to cut the actual bulk product 216 along a line that corresponds to the cut path 310. For example, the controller 102 may generate one or more control signals that are conveyed to the cutting device 110 and instruct the operation of the cutting device 110. The control signals instruct the first cut location on the bulk product 216, the direction at which the cutting device 110 is to cut, and/or a depth at which to cut the bulk product 216. In the example shown in FIG. 2, the laser emitter 226 is controlled by the controller 102 to emit laser beams 224 that impinge on the bulk product 216 along a prescribed cut path 320 that corresponds to (e.g., is the equivalent of) the cut path 310 on the three-dimensional coordinate map 302. In another example, the cutting device 110 includes a cutting blade and an arm, and the controller 102 generates control signals to control the movement of the arm to automatically move the cutting blade to cut the bulk product 216 along the cut path 320.

Once the cutting device 110 completes the cutting process, the target portion 312 of the bulk product 216 is severed from the remainder of the bulk product 216. The operator may then package the target portion 312 and separately package and/or store the remainder of the bulk product 216. The controller 102 may control the printer 206 to produce the label 208 that describes information about the target portion 312. The label 208 may be affixed to the packaging of the target portion 312. The information on the label 208 may include the type of product, a cost or price associated with the target portion 312, a cost or price per weight of the bulk product 216, the target weight of the target portion 312, and/or the like. Optionally, the operator may choose to weigh the target portion 312 to confirm that the target portion 312 weighs approximately the target weight.

In one or more embodiments, the controller 102 may determine respective locations of internal constituent elements of the bulk product 216, and may determine the cut path based in part on the locations of the internal constituent elements. For example, a bulk product that is meat may include various internal constituent elements within the bulk product that have different material compositions from one another. Example internal constituent elements can include bones, fat, fins, a tail, or the like. Furthermore, the internal constituent elements could include different designated cuts of meat from an animal, such as T-bone, porterhouse, top loin, and filet mignon as different cuts of beef.

The controller 102 may determine locations of such internal constituent elements in the bulk product 216, and may use the locations as a factor in determining the cut path. For example, a user may desire for the target portion that is excised to omit (e.g., be free of) a first constituent element. In that case, the controller 102 may determine the cut path based on the location(s) of the first constituent elements so that the target portion that is excised is free of the first constituent element. As an example, the first constituent element can be bones, fat, fins, or a tail. In another example, the user may desire for the target portion to include a second constituent element, such as fat. In that case, the controller 102 may determine the cut path so that the target portion that is excised includes more fat than another portion of the bulk product that could have been excised.

Figure 4:
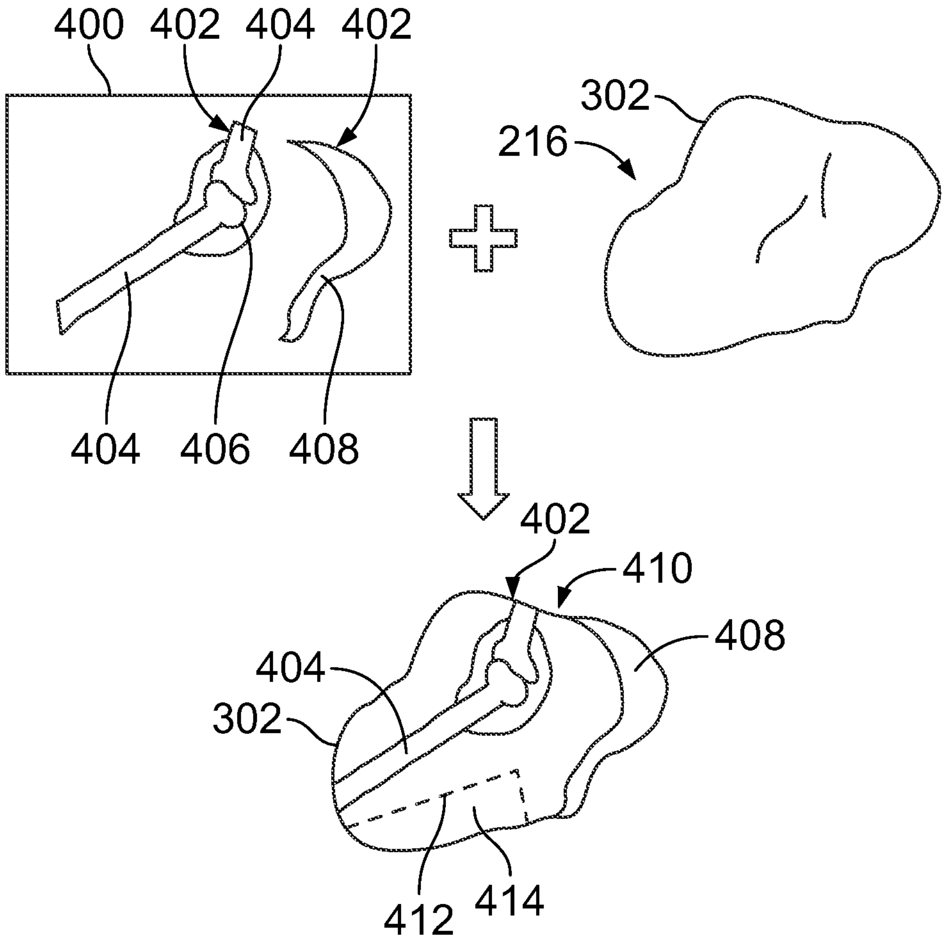
FIG. 4 illustrates a diagram showing a template and the three-dimensional coordinate map of the bulk product.

The internal constituent elements are typically not visible along the outer perimeter of the bulk product. In an example, the controller 102 may determine the respective locations of the internal constituent elements within the bulk product itself by first identifying the bulk product. The controller 102 may identify the bulk product using the techniques described above. In one example, the controller 102 may use the identity of the bulk product to access a template that is associated with and based on the bulk product. FIG. 4 illustrates a diagram showing a template 400 and the three-dimensional coordinate map 302 of the bulk product 216. The controller 400 selects the template 400 from a memory device, such as the memory 106, based on the identity of the bulk product 216. The template 400 may be a digital rendering that indicates respective locations of various internal constituent elements 402 of the bulk product 215. In FIG. 4, the template 400 shows, as internal constituent elements 402, bones 404, a bone joint 406, and fat 408. The template 400 may be three-dimensional, or may be two-dimensional but able to be repositioned and rotated in three dimensions. The controller 102 may use the coordinate field to map or format the template 400 to align with the three-dimensional coordinate map 302 of the bulk product 216, such that the internal constituent elements 402 align within the boundary of the three-dimensional coordinate map 302. FIG. 4 shows a combined image 410 that represents the template 400 aligned with the three-dimensional coordinate map 302. The internal constituent elements 402 appear to be superimposed on the three-dimensional coordinate map 302. The controller 102 may use the coordinate positions of the internal constituent elements 402 and the types of the internal constituent elements 402 as a factor in determining the cut path. For example, in FIG. 4, if a user (e.g., customer) indicates that the user would like a lean, boneless portion of meat, the controller 102 may determine a cut path 412 through the bulk product 216 that would yield a target portion 414 of meat that is free of bones 404 and the fat section 408, while satisfying the target weight requirement.

In another, related example, instead of accessing a template 400, the controller 102 may estimate respective locations of internal constituent elements of the bulk product based on the determined identity of the bulk product and an analysis of a size and shape of the three-dimensional coordinate map 302 of the bulk product. For example, the controller 102 can determine the size and orientation of the bulk product 216 based on the three-dimensional coordinate map 302. The controller 102 may determine the relative types and locations of the internal constituent elements within the bulk product based on the identity of the bulk product. The controller 102 may use the orientation and the size of the bulk product on the platform 204 to determine the specific locations, sizes, and orientations of the internal constituent elements within the bulk product. The controller can then determine the cut path based on the target volume and these determined locations of the internal constituent elements of the bulk product, as described above with respect to FIG. 4.

Figure 5:
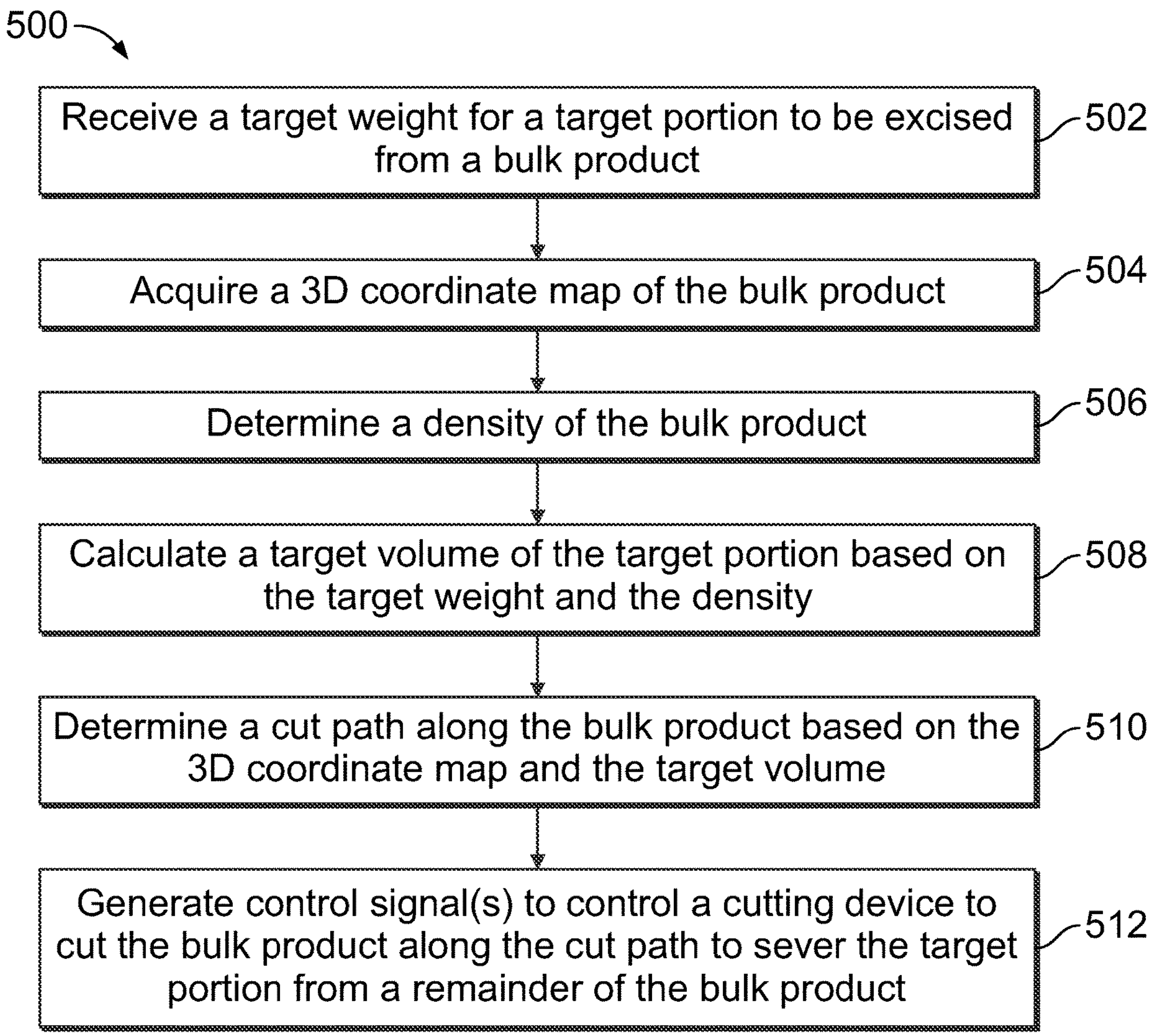
FIG. 5 is a flow chart of a method for excising a target portion of a bulk product according to one or more embodiments.

FIG. 5 is a flow chart 500 of a method for excising (e.g., cutting out) a target portion of a bulk product that has a target weight according to an embodiment. The method may be performed, in whole or in part, by the controller 102 of the portion control system 100 (e.g., the portion control machine 200). Optionally, the method may include additional steps than shown in FIG. 5, fewer steps than shown in FIG. 5, and/or different steps than shown in FIG. 5.

At step 502, a target weight is received for a target portion to be excised from a bulk product. At step 504, a three-dimensional coordinate map of the bulk product is acquired. The three-dimensional coordinate map may be generated by an optical scanner while the bulk product is disposed on a platform. At step 506, a density of the bulk product is determined. Optionally, the density of the bulk product may be determined by first measuring a weight of the bulk product via a weight scale. The weight scale may be integrated with a platform on which the bulk product is placed. The method may include determining a volume of the bulk product based on the three-dimensional coordinate map of the bulk product. The density of the bulk product may be determined by calculating the density based on the weight of the bulk product and the volume of the bulk product. For example, the density is mass (or weight) divided by volume. Optionally, the density of the bulk product may be determined by first determining an identity of the bulk product. Then, the method includes accessing a look-up table that associates density values with different corresponding bulk products. The density may be determined by looking up the density value in the look-up table that corresponds to the specific bulk product that is identified. In another example, the density may be determined using a sensor device that measures the density directly.

At step 508, a target volume of the target portion to be excised is calculated based on the target weight and the density. For example, the target volume is calculated by dividing the target weight by the density that is determined in step 506.

At step 510, a cut path is determined along the bulk product that is disposed on the platform. The cut path may be determined based at least on the three-dimensional coordinate map of the bulk product and the target volume that is calculated at step 508. The cut path is determined to yield a severed target portion of the bulk produce that has the target volume. Optionally, the cut path may also be determined based on the determined (e.g., estimated) locations of one or more internal constituent elements of the bulk product. In an first example, the method may include determining an identity of the bulk product, and then accessing a template based on the identity of the bulk product. The template may indicate respective locations of internal constituent elements of the bulk product. The method may involve comparing the three-dimensional coordinate map of the bulk product to the template to estimate the locations of the internal constituent elements within the bulk product as sized and oriented on the platform. The cut path may be determined based in part on the locations of the internal constituent elements of the bulk product, such as to avoid a first internal constituent element in the target portion and/or to include a second internal constituent element in the target portion. In a second example, the method may include determining the identity of the bulk product and then analyzing a size and shape of the three-dimensional coordinate map of the bulk product to estimate respective locations of internal constituent elements of the bulk product based on the identity of the bulk product. The cut path may be determined based on both the target volume and the locations of the internal constituent elements of the bulk product, such as to avoid a first internal constituent element in the target portion and/or to include a second internal constituent element in the target portion.

At step 512, a control signal is generated to control a cutting device to cut the bulk product along the cut path to sever the target portion from a remainder of the bulk product. Optionally, the method may include packaging the target portion that is severed and/or printing a label that provides information about the target portion.

In an embodiment, the optical scanner 108 shown in FIGS. 1 and 2 may be a laser volumeter. The laser volumeter uses a laser beam to detect the distance to the bulk product that is disposed on the platform to scan its shape. The laser volumeter provides a relatively quick, non-contact volume measurement. The measurement results may quantify the shape of the bulk product using actual units of length. In another embodiment, the optical scanner 108 may be a coordinate measuring machine (CMM). The CMM may include a high-definition complementary metal-oxide-semiconductor (CMOS) image sensor/camera. The CMOS image sensor may have a photodiode and a CMOS transistor switch for each pixel, allowing the pixel signals to be amplified individually. By operating a matrix of switches, the pixel signals can be accessed directly and sequentially. Each pixel may have a different respective amplifier. Length and volume measurements may be obtained directly from the acquired data. For example, the measurements may include geometric dimensioning and tolerancing (GD&T) measurements.

Further the disclosure comprises examples according to the following clauses:

Clause 1. A portion control system comprising:

an optical scanner configured to generate a three-dimensional coordinate map of a bulk product disposed on a platform;

a cutting device; and a controller including one or more processors and operably connected to the optical scanner and the cutting device, the controller configured to:

receive a target weight for a target portion to be excised from the bulk product, determine a density of the bulk product, calculate a target volume of the target portion to be excised based on the target weight and the density, determine, based at least on the three-dimensional coordinate map of the bulk product and the target volume, a cut path through the bulk product that is disposed on the platform, and control the cutting device to cut the bulk product along the cut path to sever the target portion from a remainder of the bulk product.

Clause 2. The portion control system of Clause 1, further comprising a user input device operably connected to the controller and configured to receive a user input command that indicates the target weight of the target portion to be excised from the bulk product.

Clause 3. The portion control system of Clause 1 or Clause 2, further comprising a weight scale integrated with the platform and configured to measure a weight of the bulk product that is disposed on the platform.

Clause 4. The portion control system of Clause 3, wherein the controller is configured to determine a volume of the bulk product based on the three-dimensional coordinate map of the bulk product, and the controller is configured to determine the density of the bulk product by calculating the density based on the weight of the bulk product and the volume of the bulk product.

Clause 5. The portion control system of any of Clauses 1-4, wherein the controller is configured to determine an identity of the bulk product, and the controller is configured to determine the density of the bulk product by accessing a look-up table that associates density values with different corresponding bulk products.

Clause 6. The portion control system of any of Clauses 1-5, wherein the cutting device comprises at least one of a cutting blade or a laser that is controlled to cut the bulk product along the cut path.

Clause 7. The portion control system of any of Clauses 1-6, wherein the optical scanner is configured to generate the three-dimensional coordinate map of a food product as the bulk product.

Clause 8. The portion control system of any of Clauses 1-7, wherein the optical scanner is configured to generate the three-dimensional coordinate map of an irregularly shaped product as the bulk product.

Clause 9. The portion control system of any of Clauses 1-8, further comprising an output device configured to print a label, the controller configured to control the output device to print the label to indicate at least one of a type of the bulk product, the target weight for the target portion, or a price associated with at least one of the bulk product or the target portion.

Clause 10. The portion control system of any of Clauses 1-9, wherein the optical scanner is one of a laser volumeter or a non-contact coordinate measuring machine (CMM).

Clause 11. The portion control system of any of Clauses 1-10, wherein the controller is further configured to determine an identity of the bulk product, access a template based on the identity of the bulk product, and compare the three-dimensional coordinate map of the bulk product to the template, wherein the template indicates respective locations of internal constituent elements of the bulk product, wherein the controller is configured to determine the cut path based on the target volume and the locations of the internal constituent elements of the bulk product.

Clause 12. The portion control system of Clause 11, wherein the controller is configured to determine the cut path for the target portion to be excised to omit a first internal constituent element of the bulk product.

Clause 13. The portion control system of Clause 11, wherein the internal constituent elements comprise at least one of bones, fat, fins, or a tail.

Clause 14. The portion control system of Clause 11, wherein the bulk product is a portion of an animal and the internal constituent elements comprise different designated cuts of meat from the animal.

Clause 15. The portion control system of any of Clauses 1-14, wherein the controller is further configured to determine an identity of the bulk product and to analyze a size and shape of the three-dimensional coordinate map of the bulk product to estimate respective locations of internal constituent elements of the bulk product based on the identity of the bulk product, wherein the controller is configured to determine the cut path based on the target volume and the locations of the internal constituent elements of the bulk product.

Clause 16. A method comprising:

receiving, at a controller comprising one or more processors, a target weight for a target portion to be excised from a bulk product;

acquiring a three-dimensional coordinate map of the bulk product, the three-dimensional coordinate map generated by an optical scanner while the bulk product is disposed on a platform;

determining, via the controller, a density of the bulk product;

calculating a target volume of the target portion to be excised based on the target weight and the density;

determining, via the controller and based at least on the three-dimensional coordinate map of the bulk product and the target volume, a cut path along the bulk product that is disposed on the platform; and generating a control signal to control a cutting device to cut the bulk product along the cut path to sever the target portion from a remainder of the bulk product.

Clause 17. The method of Clause 16, further comprising:

measuring a weight of the bulk product disposed on the platform via a weight scale integrated with the platform; and determining a volume of the bulk product based on the three-dimensional coordinate map of the bulk product, wherein determining the density of the bulk product comprises calculating the density based on the weight of the bulk product and the volume of the bulk product.

Clause 18. The method of Clause 16 or Clause 17, further comprising:

determining an identity of the bulk product, wherein determining the density of the bulk product comprises accessing a look-up table that associates density values with different corresponding bulk products.

Clause 19. The method of any of Clauses 16-18, further comprising:

determining an identity of the bulk product;

accessing a template based on the identity of the bulk product, wherein the template indicates respective locations of internal constituent elements of the bulk product; and comparing the three-dimensional coordinate map of the bulk product to the template, wherein determining the cut path is based on both the target volume and the locations of the internal constituent elements of the bulk product.

Clause 20. The method of any of Clauses 16-19, further comprising:

determining an identity of the bulk product; and analyzing a size and shape of the three-dimensional coordinate map of the bulk product to estimate respective locations of internal constituent elements of the bulk product based on the identity of the bulk product, wherein determining the cut path is based on both the target volume and the locations of the internal constituent elements of the bulk product.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

If a system, apparatus, assembly, device, etc. (e.g., a controller, control device, control unit, etc.) includes multiple processors, these processors may be located in the same housing or enclosure (e.g., in the same device) or may be distributed among or between two or more housings or enclosures (e.g., in different devices). The multiple processors in the same or different devices may each perform the same functions described herein, or the multiple processors in the same or different devices may share performance of the functions described herein. For example, different processors may perform different sets or groups of the functions described herein.

As used herein, the "one or more processors" may individually or collectively, as a group, perform these operations. For example, the "one or more" processors can indicate that each processor performs each of these operations, or that each processor performs at least one, but not all, of these operations.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

What is claimed is:

1. A portion control system comprising:

an optical scanner configured to generate a three-dimensional coordinate map of a bulk product disposed on a platform, wherein the platform is configured to revolve 360 degrees about a central axis to spin the bulk product relative to the optical scanner;

a cutting device; and a controller including one or more processors and operably connected to the optical scanner and the cutting device, the controller configured to:

receive a target weight for a target portion to be excised from the bulk product, determine a density of the bulk product, calculate a target volume of the target portion to be excised based on the target weight and the density, determine, based at least on the three-dimensional coordinate map of the bulk product and the target volume, a cut path through the bulk product that is disposed on the platform, and control the cutting device to cut the bulk product along the cut path to sever the target portion from a remainder of the bulk product.

2. The portion control system of claim 1, further comprising a user input device operably connected to the controller and configured to receive a user input command that indicates the target weight of the target portion to be excised from the bulk product.

3. The portion control system of claim 1, further comprising a weight scale integrated with the platform and configured to measure a weight of the bulk product that is disposed on the platform.

4. The portion control system of claim 3, wherein the controller is configured to determine a volume of the bulk product based on the three-dimensional coordinate map of the bulk product, and the controller is configured to determine the density of the bulk product by calculating the density based on the weight of the bulk product and the volume of the bulk product.

5. The portion control system of claim 1, wherein the controller is configured to determine an identity of the bulk product, and the controller is configured to determine the density of the bulk product by accessing a look-up table that associates density values with different corresponding bulk products.

6. The portion control system of claim 1, wherein the cutting device comprises at least one of a cutting blade or a laser that is controlled to cut the bulk product along the cut path.

7. The portion control system of claim 1, wherein the optical scanner is configured to generate the three-dimensional coordinate map of a food product as the bulk product.

8. The portion control system of claim 1, wherein the optical scanner is configured to generate the three-dimensional coordinate map of an irregularly shaped product as the bulk product.

9. The portion control system of claim 1, further comprising an output device configured to print a label, the controller configured to control the output device to print the label to indicate at least one of a type of the bulk product, the target weight for the target portion, or a price associated with at least one of the bulk product or the target portion.

10. The portion control system of claim 1, wherein the optical scanner is one of a laser volumeter or a non-contact coordinate measuring machine (CMM).

11. The portion control system of claim 1, wherein the controller is further configured to determine an identity of the bulk product, access a template based on the identity of the bulk product, and compare the three-dimensional coordinate map of the bulk product to the template, wherein the template indicates respective locations of internal constituent elements of the bulk product, wherein the controller is configured to determine the cut path based on the target volume and the locations of the internal constituent elements of the bulk product.

12. The portion control system of claim 11, wherein the controller is configured to determine the cut path for the target portion to be excised to omit a first internal constituent element of the bulk product.

13. The portion control system of claim 11, wherein the internal constituent elements comprise at least one of bones, fat, fins, or a tail.

14. The portion control system of claim 11, wherein the bulk product is a portion of an animal and the internal constituent elements comprise different designated cuts of meat from the animal.

15. The portion control system of claim 1, wherein the controller is further configured to determine an identity of the bulk product and to analyze a size and shape of the three-dimensional coordinate map of the bulk product to estimate respective locations of internal constituent elements of the bulk product based on the identity of the bulk product, wherein the controller is configured to determine the cut path based on the target volume and the locations of the internal constituent elements of the bulk product.

16. A method comprising:

receiving, at a controller comprising one or more processors, a target weight for a target portion to be excised from a bulk product;

acquiring a three-dimensional coordinate map of the bulk product, the three-dimensional coordinate map generated by an optical scanner while the bulk product is disposed on a platform, wherein the platform is configured to revolve 360 degrees about a central axis to spin the bulk product relative to the optical scanner;

determining, via the controller, a density of the bulk product;

calculating a target volume of the target portion to be excised based on the target weight and the density;

determining, via the controller and based at least on the three-dimensional coordinate map of the bulk product and the target volume, a cut path along the bulk product that is disposed on the platform; and generating a control signal to control a cutting device to cut the bulk product along the cut path to sever the target portion from a remainder of the bulk product.

17. The method of claim 16, further comprising:

measuring a weight of the bulk product disposed on the platform via a weight scale integrated with the platform; and determining a volume of the bulk product based on the three-dimensional coordinate map of the bulk product, wherein determining the density of the bulk product comprises calculating the density based on the weight of the bulk product and the volume of the bulk product.

18. The method of claim 16, further comprising:

determining an identity of the bulk product, wherein determining the density of the bulk product comprises accessing a look-up table that associates density values with different corresponding bulk products.

19. The method of claim 16, further comprising:

determining an identity of the bulk product;

accessing a template based on the identity of the bulk product, wherein the template indicates respective locations of internal constituent elements of the bulk product; and comparing the three-dimensional coordinate map of the bulk product to the template, wherein determining the cut path is based on both the target volume and the locations of the internal constituent elements of the bulk product.

20. The method of claim 16, further comprising:

determining an identity of the bulk product; and analyzing a size and shape of the three-dimensional coordinate map of the bulk product to estimate respective locations of internal constituent elements of the bulk product based on the identity of the bulk product, wherein determining the cut path is based on both the target volume and the locations of the internal constituent elements of the bulk product.

* * * * *